Figure 1:
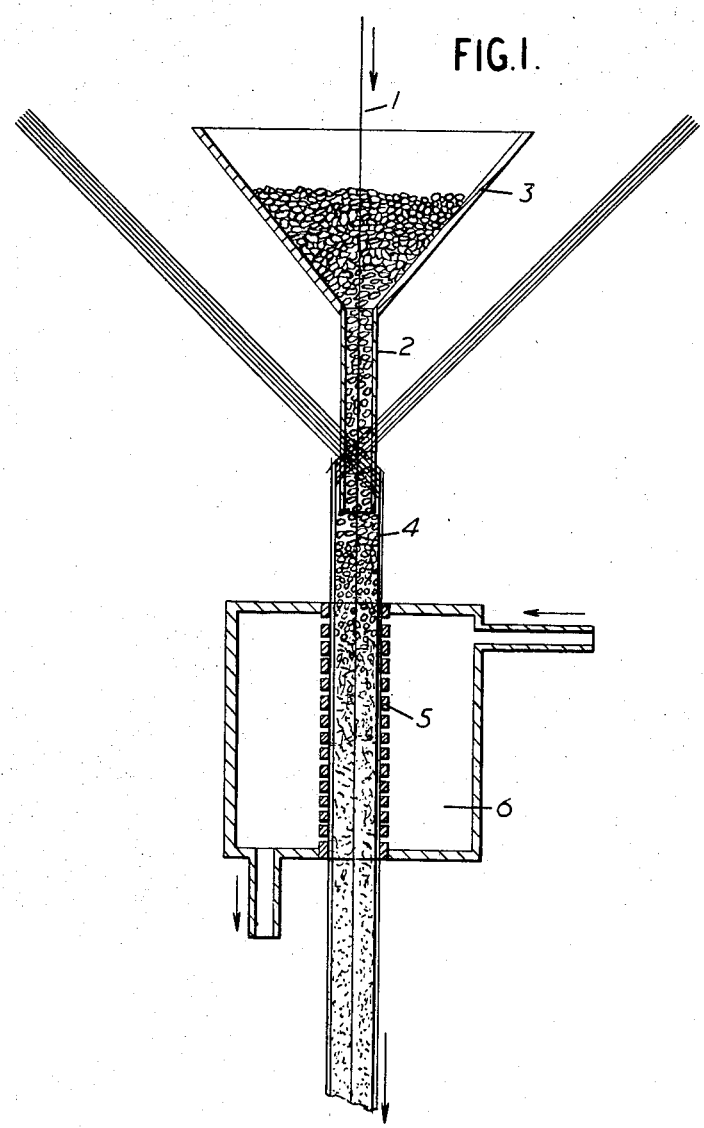

United States Patent Office

3,144,369
Patented Aug. 11, 1964

3,144,369
METHOD OF FORMING A COAXIAL CABLE
Stanley George Foord and Walter Eric Simpson, London, England, assignors to International Standard Electric Corporation, New York, N.Y.
Filed Apr. 18, 1960, Ser. No. 23,015
Claims priority, application Great Britain Apr. 30, 1959
4 Claims. (Cl. 156—51)

This invention relates to the manufacture of electric conductors insulated by a thermoplastic insulating material expanded into cellular form of lower density than that of the original thermoplastic material.

It is well known to extrude round a conductor or conductors a thermoplastic in which is incorporated a material which produces a gas, the thermoplastic being blown into cellular form under the conditions of extrusion so that there is produced around the conductor an insulating material of low dielectric constant.

If such an insulated conductor is to be used for construction of a coaxial cable, which is the main use thereof, by the application to the exterior of the insulating material of a suitable outer conductor, it is difficult to ensure accuracy in the external dimensions of the insulating covering and very great care must be exercised in the extrusion and expansion process. For this reason there is a limitation on the degree of expansion obtainable.

According to the present invention granules of a suitable thermoplastic material are fed between the inner and outer conductors.

The granules of suitable thermoplastic material are subjected to some degree of pre-expansion and a limited range of size of these pre-expanded granules fed into the space between inner and outer conductors.

By way of example, polystyrene in the form of beads with an expanding agent incorporated is heated to a temperature of from 80° C. to 100° C. The preferred method of heating is to submerge the beads in a hot water bath and a period of 4 minutes at 95° C. has been found satisfactory. After pre-expansion and rough drying the beads are allowed to stand whilst freely exposed to the atmosphere to equilibrate the low pressure inside the beads with the external pressure. Either before or after this conditioning period the pre-expanded beads are sieved to select the range of size from $\frac{1}{32}$ inch to $\frac{1}{8}$ inch diameter for use as hereinafter described.

The material of the pre-expanded granules need not be limited to polystyrene and can be any of the known plastic materials which can be made in granular form with some residual blowing agent which permits expansion while in a plastic state and which has satisfactory mechanical and electrical properties. Thus polydichlorostyrenes, styrene/α-methyl styrene copolymer, and other copolymers containing a major proportion of styrene are satisfactory. If the dielectric losses of the cable are of secondary importance a wider range of resins such as polycarbonates, epoxides and polyurethanes can be used. PTFE is not suitable as it cannot be obtained in a form containing a blowing agent. Polythene is also not suitable because of unsatisfactory mechanical properties.

Figure 2:
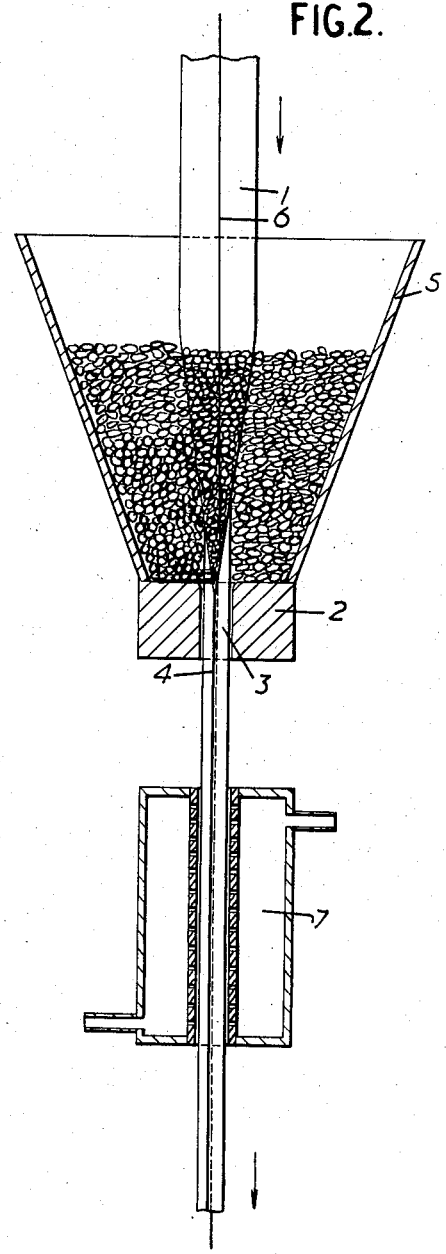

One process for applying the pre-expanded plastic material as cable insulant is described with reference to the accompanying drawings in which:

FIG. 1 shows the process as applied to the making of a coaxial cable with braided outer conductor, and FIG. 2 shows the process as applied to the making of a coaxial cable with a tubular outer conductor.

Referring to the drawings and first to FIG. 1, the conductor 1 passes vertically downwards through the center of a suitable braiding machine which has been adapted to apply the braid below the base plate of the machine. This is contrary to the normal practice when the conductor travels vertically upwards and the braid is applied above the base plate. At a suitable point below the base plate, the conductor passes through a short circular metal tube 2 whose outside diameter is approximately equal to the required outside diameter of the insulation. A funnel 3 is fitted to the top of the tube, and is continuously fed with suitably screened pre-expanded beads which are uniformly distributed around the conductor as it passes through the tube. A suitable tubular braided outer conductor 4 is formed on the lower part of tube 2 and moves downwards off this tube in the direction of movement of the conductor.

Having now arranged the pre-expanded beads around the centre conductor, and applied the outer restraining conductor, the next stage is to complete the expansion process and form a homogenized structure of expanded dielectric by fusing together the expanded beads. For this purpose, live steam, hot air, or some other suitable source of heat is employed, the essential requirement being that it should provide rapid heat transfer to the expanding plastic. In the example shown in FIG. 1, live steam is used, and has been found to give satisfactory results. The steam is applied to the cable through the perforated tube 5 surrounded by the steam jacket 6 which is supplied with live steam from an external source. The inside diameter of the perforated tube 5 is approximately equal to the required braided diameter of the cable, a suitable allowance being made for the contraction of the expanded dielectric on cooling from the expansion temperature.

An alternative method of final expansion which gives a rapid heat transfer to the plastic beads is to add water to the pre-expanded beads and vapourising it by the application of external "dry" heat such as hot air or radiant heat.

After the expansion stage, the cable is pssed through a suitable cooling zone to reduce the temperature below about 70° C. and thereby set the expanded structure. Beyond this point it passes through a drying zone maintained at above 60° C. which serves to remove residual volatile matter from the expanded dielectric. The braided core is then wound on to a suitable bobbin for subsequent processing.

The second example of this process, illustrated diagrammatically in FIG. 2, employs a tubular metal outer conductor formed from metal tape. The metal tape 1 is passed through a die 2 which, as shown in the drawing, forms it into a circular section 3, having an overlap, butt or other suitable longitudinal joint 4 which is completed after the formed tube leaves the die. Mounted on top of the die is a funnel 5 which is continuously fed with pre-expanded beads to maintain the level shown in the drawing. This funnel serves as a supply reservoir, and gravity feeds pre-expanded beads into the tubular outer conductor, as it is formed by passage through the die, and through which the centre conductor 6 passes. This arrangement ensures that the annular space between the conductors is continuously filled with pre-expanded beads. As an alternative to the above, the operation can be carried out horizontally in which case a controlled gravity feed of pre-expanded beads is directed into the trough shape which is produced as the metal tape approaches the forming die.

The next stage after the tubular outer conductor has been formed and the longitudinal joint completed, is the final expansion stage as shown at 7. By the application of further heat the pre-expanded beads undergo further expansion and are fused together to fill the annular space between the inner and outer conductors with a homogeneous expanded dielectric. This operation is carried out as in the first example described using live steam, hot air or any other suitable heating medium which gives a rapid transfer of heat to the beads. In order to increase the rate of heat transfer and ease the penetration of steam or other heating medium, the metal tape of the outer conductor can be provided with perforations at regular intervals. Finally, as in the previous example, the cable is cooled to set the expanded structure, and is then dried to remove volatile matter.

In a further example of this invention, the outer conductor is formed from longitudinal interlocking metal tape. The process is otherwise similar to the examples already described.

A coaxial cable having a braided outer conductor and manufactured according to the process illustrated in FIG. 1 was found to have insulation with a density of 0.05 grams per cc. which is approximately equivalent to a 20 fold expansion. The power factor at 30 mc./s. is less than 0.0001 and the dielectric constant at the same frequency about 1.08.

While the principles of the invention have been described above in connection with specific embodiments, and particular modifications thereof, it is to be clearly understood that this description is made only by way of example and not as a limitation on the scope of the invention.

What we claim is:

1. A method of manufacture of expanded plastic insulated cables including the steps of pre-expanding granules of suitable thermoplastic material containing a blowing agent, feeding the pre-expanded granules in the space between an inner conductor and a tubular former surrounding said conductor, forming an outer conductor, heating the resultant structure to expand further and to coalesce the granules into a continuous body, and limiting the external diameter to which said outer conductor can expand during said heating step whereby a desired uniform diameter is achieved.

2. Method of manufacturing a coaxial electric communication cable which comprises the steps of passing an inner conductor through the centre of a short tubular former, feeding pre-expanded granular plastic insulating material around said conductor while passing through said former, applying an outer conductor around the inner conductor and surrounding plastic material as they emerge from said former and heating the resultant structure to further expand and coalesce the said granules, and during said heating step limiting the external diameter to which said outer conductor can expand.

3. A method according to claim 2 in which the outer conductor is formed by folding a metal strip into a tube by passing said strip through a die.

4. A method according to claim 3 in which the formed cable is drawn through a heated enclosure and the pre-expanded cable insulation is finally expanded and coalesced.

References Cited in the file of this patent

UNITED STATES PATENTS 1,977,325 Pfannkuch _____ Oct. 16, 1934

FOREIGN PATENTS 458,254 Great Britain _____ Dec. 14, 1936
969,439 Germany _____ June 4, 1958
970,842 Germany _____ Nov. 6, 1958